US010445773B1

(12) United States Patent
Larocca et al.

(10) Patent No.: US 10,445,773 B1
(45) Date of Patent: Oct. 15, 2019

(54) CONNECTED GUEST PLATFORM

(71) Applicant: DreamWorks Animation LLC, Glendale, CA (US)

(72) Inventors: Scott Larocca, Altadena, CA (US); Paul Kurzawa, Glendale, CA (US)

(73) Assignee: DreamWorks Animation L.L.C., Universal City, CA (US)

( * ) Notice: Subject to any disclaimer, the term of this patent is extended or adjusted under 35 U.S.C. 154(b) by 1043 days.

(21) Appl. No.: 14/534,082

(22) Filed: Nov. 5, 2014

(51) Int. Cl.
*G06Q 10/02* (2012.01)
*G06Q 30/02* (2012.01)

(52) U.S. Cl.
CPC ......... *G06Q 30/0252* (2013.01); *G06Q 10/02* (2013.01); *G06Q 30/0201* (2013.01)

(58) Field of Classification Search
CPC ............................. G06Q 30/02; G06Q 10/02
USPC .............................................................. 705/5
See application file for complete search history.

(56) References Cited

U.S. PATENT DOCUMENTS

| | | | | |
|---|---|---|---|---|
| 9,456,279 | B1* | 9/2016 | Murdoch | H04R 27/00 |
| 2003/0086123 | A1* | 5/2003 | Torrens-Burton | |
| | | | | H04N 1/00132 |
| | | | | 358/402 |
| 2008/0228597 | A1* | 9/2008 | Sondles | G06Q 30/0277 |
| | | | | 705/14.73 |
| 2009/0216547 | A1* | 8/2009 | Canora | G06Q 30/02 |
| | | | | 705/346 |
| 2011/0090356 | A1* | 4/2011 | Hirata | G06T 1/00 |
| | | | | 348/222.1 |
| 2013/0191251 | A1* | 7/2013 | Martin | G06Q 30/0601 |
| | | | | 705/26.61 |
| 2013/0304522 | A1* | 11/2013 | Cundle | G06Q 10/02 |
| | | | | 705/5 |
| 2014/0168477 | A1* | 6/2014 | David | G06Q 30/0601 |
| | | | | 348/240.2 |
| 2015/0088561 | A1* | 3/2015 | Charles | G06Q 10/02 |
| | | | | 705/5 |
| 2015/0348049 | A1* | 12/2015 | Todasco | G06Q 10/02 |
| | | | | 705/5 |

OTHER PUBLICATIONS

Jordan, "jordan photography" (Year: 2014).*
Extended European Search Report (includes Partial European Search Report and Search Opinion) received for European Patent Application No. 15193006.6, dated Dec. 8, 2015, 6 pages.
Office Action received for European Patent Application No. 15193009.6, dated Feb. 20, 2017, 4 pages.

* cited by examiner

*Primary Examiner* — Brian M Epstein
*Assistant Examiner* — Zeina Elchanti
(74) *Attorney, Agent, or Firm* — Dentons US LLP

(57) ABSTRACT

A connected guest platform receives information identifying a user's planned visit to an entertainment attraction that is located at a physical location, the user's biographical information, and the user's shopping preferences. Features of the attraction are customized based on the user's information. Goods created at the attraction can be stored with the connected guest platform. Third-parties may purchase items from the user's wish list for pickup at a physical merchant located adjacent to the attraction. The user's experience at the attraction and shopping history are stored to inform future interactions with the connected guest platform.

23 Claims, 15 Drawing Sheets

US 10,445,773 B1

CONNECTED GUEST PLATFORM

BACKGROUND

The present disclosure relates to a computing platform for managing a user's online and offline, physical experiences, particularly with respect to location-based entertainment attractions and retail shopping.

BRIEF SUMMARY

In some embodiments, a connected guest system comprises a server operably connected over the internet to a plurality of remote computing systems, the server comprising storage memory connected to one or more processors configured to: receive data representing a user's scheduling of a reservation at a holiday attraction located at a physical shopping mall; receive data representing at least one requested gift for a gift-recipient other than the user; responsive to receiving data representing the user's actual visit to the holiday attraction, transmit data representing the at least one requested gift to an electronic device located at the holiday attraction; assign an identification for the user and associate the at least one gift and information generated from the actual visit to the holiday attraction to the identification; and transmit the information generated from the actual visit to the holiday attraction to the holiday attraction.

In some embodiments, a method of tracking guest experiences comprises receiving data representing a user's scheduling of a reservation at a holiday attraction located at a physical shopping mall; receiving data representing at least one requested gift for a gift-recipient other than the user; responsive to receiving data representing the user's actual visit to the holiday attraction, transmitting data representing the at least one requested gift to an electronic device located at the holiday attraction; assigning an identification for the user and associating the at least one gift and information generated from the actual visit to the holiday attraction to the identification; and transmitting the information generated from the actual visit to the holiday attraction to the holiday attraction.

In some embodiments, a non-transitory computer-readable storage medium has computer-executable instructions, where the computer-executable instructions, when executed by one or more processors of a guest tracking platform, cause the guest tracking platform to track a user's experience at a holiday attraction, the computer-executable instructions comprising instructions for: receiving data representing a user's scheduling of a reservation at a holiday attraction located at a physical shopping mall; receiving data representing at least one requested gift for a gift-recipient other than the user; responsive to receiving data representing the user's actual visit to the holiday attraction, transmitting data representing the at least one requested gift to an electronic device located at the holiday attraction; assigning an identification for the user and associating the at least one gift and information generated from the actual visit to the holiday attraction to the identification; and transmitting the information generated from the actual visit to the holiday attraction to the holiday attraction.

DETAILED DESCRIPTION

Figure 1A:
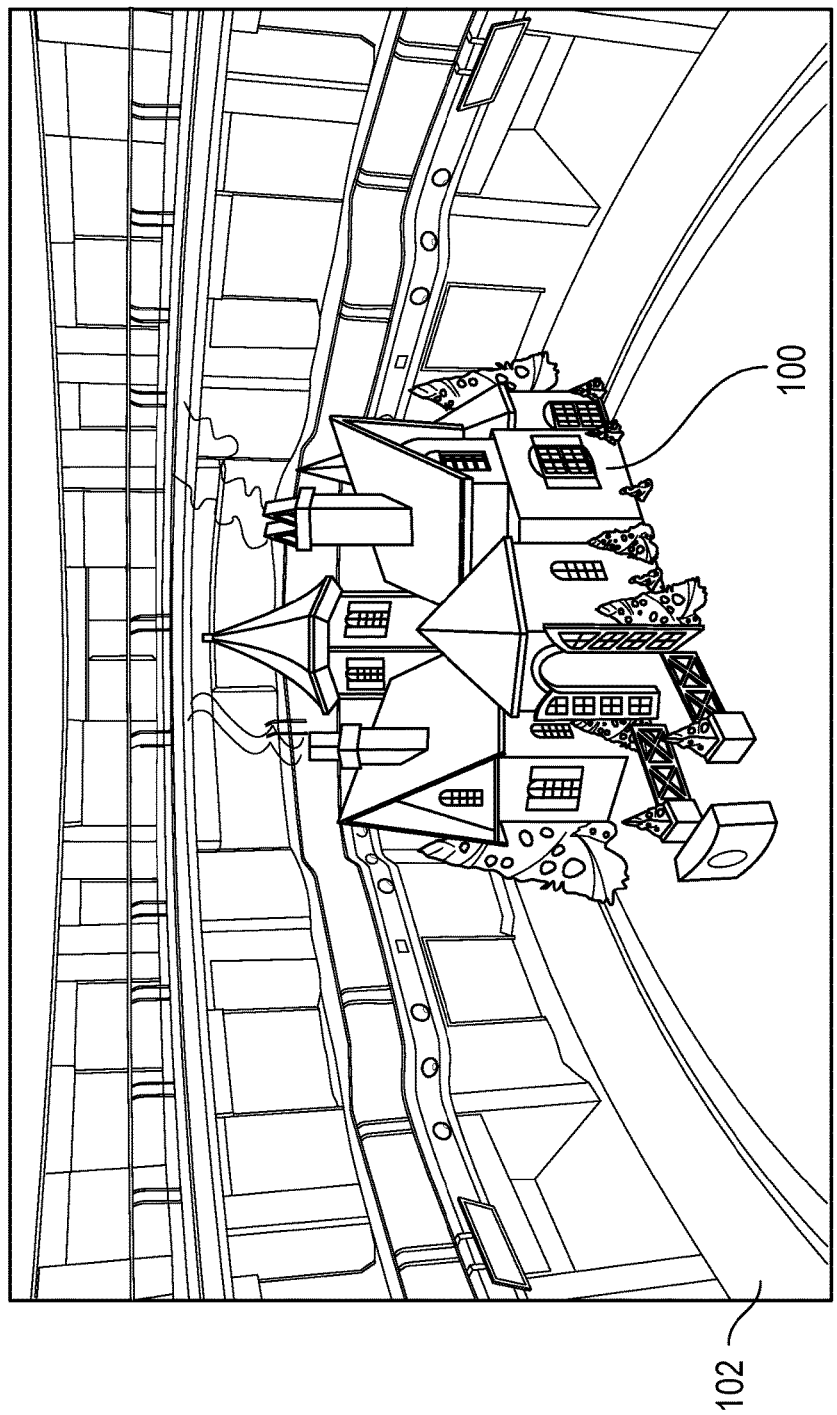
FIGS. 1A-1B depict exemplary brick-and-mortar attractions used in some embodiments to attract in-person consumer traffic.

The following description sets forth exemplary methods, parameters, and the like. It should be recognized, however, that such description is not intended as a limitation on the scope of the present disclosure but is instead provided as a description of exemplary embodiments.

The exemplary embodiments described herein include a connected guest platform for managing a user's online and offline experiences. In some embodiments, the experiences include a user's interactions with location-based entertainment attractions located among shopping attractions.

A user's experience with the connected guest platform can begin with the user's registration onto the platform. Registration can occur via a touch point such as an internet-connected electronic device. The electronic device can run an application (e.g., app) or access a web-site that transmits and receives information to the connected guest platform. Information transmitted to and received by the platform can include registration data identifying the user and, optionally, the user's family members. Based on this information, the connected guest platform assigns a "family identification" (e.g., a "Family-ID") to the user and associates the user's family information with the Family-ID. Family information may include the name, age, gender, likeness (e.g., photograph), and/or relationship (e.g., child, parent) of one or more members of the user's family.

In some embodiments, the connected guest platform uses a touch point to collect information about a user's planned visit to a location-based entertainment attraction. Such an attraction is preferably located at a brick-and-mortar (e.g., physical) shopping location. Also, the attraction preferably provides an experience (e.g., services and/or goods) that is best appreciated in-person. Upon receiving the planned visit information, the connected guest platform assigns a shopping location identification (e.g., a "Mall-ID") to the user. In one example, the connected guest platform accepts reservations for a seasonal photography venue inside a shopping mall featuring Santa Claus, leveraging the fact that photography is best done in person to encourage visitor traffic to the mall.

The connected guest platform can monitor a user's experience at various touch points of the connected guest platform, thereby ensuring that the user receives consistent experiences at those touch points. For instance, in some embodiments, the location-based entertainment attraction is connected to the connected guest platform in that the attraction's operators can access a user's information, based on Family-ID and Mall-ID, to provide a more robust and interactive experience for the user at the attraction. Staff members at the attraction can access a user's information (e.g., name, age, family members, and so forth) using an application or web browser running on an electronic device to customize the attraction for the user and the user's family. In the holiday photography example, greeters at the attraction may greet the family by name; kiosks may allow the family to create personalized keepsakes, such as a computer-generated virtual sleigh of the family's design; and photographers may upload photographs for later purchase and/or retrieval, among other possibilities.

In some embodiments, the connected guest platform collects through its touch points information about the user's shopping preferences. For example, the platform can receive a wish list identifying holiday presents that the user desires. Optionally, a user's shopping list includes items for person(s) other than the user, meaning that the platform can maintain wish lists for multiple family members tied to a Family-ID. In some embodiments, the connected guest platform informs a third party of the user's shopping lists, and/or permits third-party purchases of items listed on the user's shopping list. For example, the platform can present, via a touch point such as a web-site, the user's holiday wish list to friends and family, thereby permitting friends and family to purchase gifts electronically for the user and the user's family. In some embodiments, items on the wish list are items that can be picked up from the merchants located at the same shopping location as the entertainment attraction that the user has reserved through the connected guest platform.

1. Exemplary Location-Based Entertainment Attraction

Figure 1B:
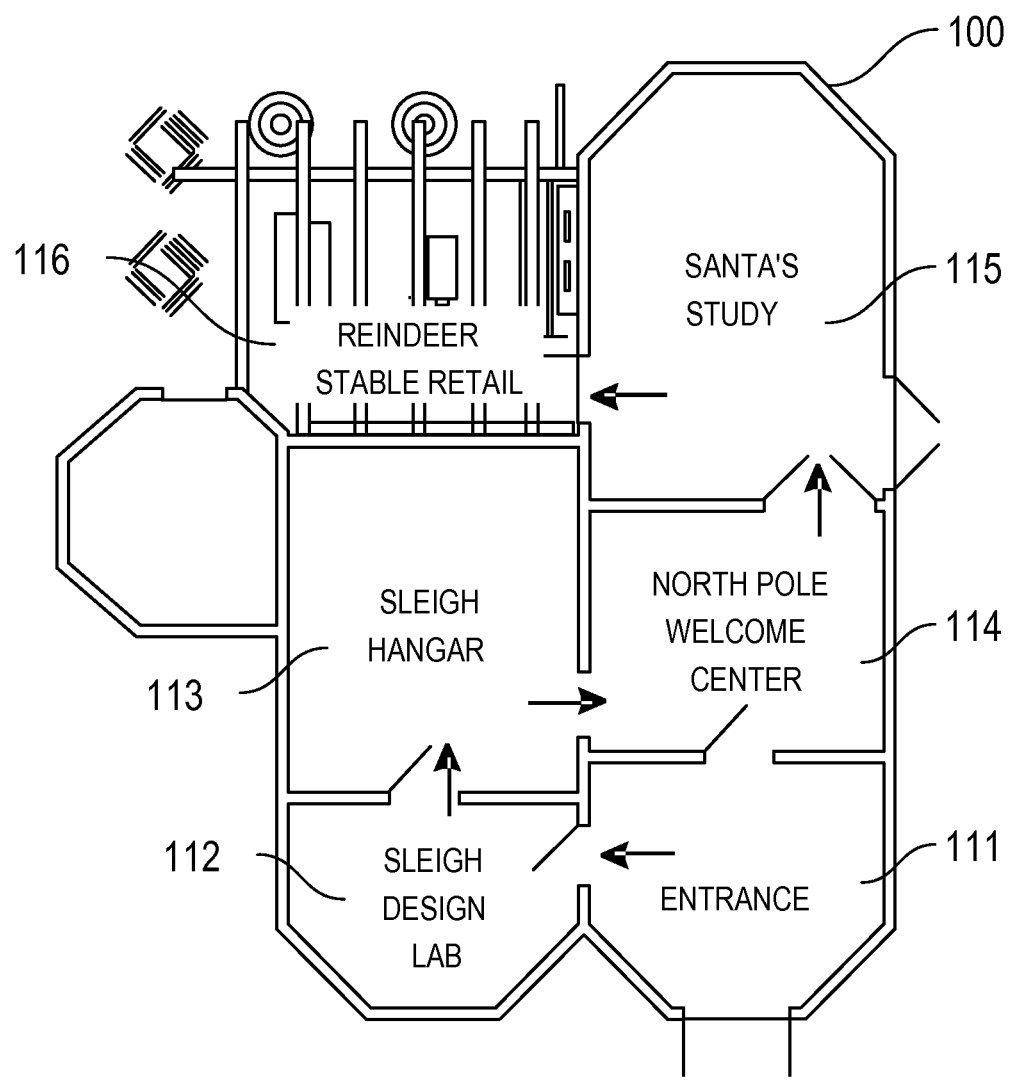

Attention is directed to an exemplary location-based entertainment attraction with reference to FIGS. 1A and 1B. FIG. 1A depicts exemplary holiday photography attraction 100. A user can reserve a visiting time at attraction 100 through a touch point of the connected guest platform, such as an electronic device application or a web-site connected to the platform. As seen in FIG. 1A, exemplary attraction 100 is a cottage-like structure staged for the winter holiday shopping season. More particularly, attraction 100 is a Christmas-themed attraction that is located at a shopping mall featuring photography with a Santa Claus-costumed character.

The thematic aspect of attraction 100 is notable in that attractions having proper themes can drive significant consumer traffic to its location. In some embodiments, attraction 100 is decorated with the likeness of famous computer-generated characters. These characters may originate from famous computer-generated movie titles. These characters may be chosen for their effectiveness at drawing visitors of specific demographics—for example younger children—to the attraction and nearby merchants. An exemplary famous computer-generated character is the Shrek character created by DreamWorks Animation LLC of Glendale, Calif.

FIG. 1B illustrates an exemplary layout of attraction 100. Exemplary attraction 100 has six rooms 111-116 that users can visit. These rooms have activities designed to entertain users of the connected guest platform and their family members who are visiting (e.g., "visitors"). In the depicted example, rooms 111-116 are designed according to a Christmas theme, allowing visitors to: design a 3D virtual sleigh, "fly" to the North Pole in a computer-generated (e.g., virtual reality) simulation, and visit with a Santa Claus character played by a staff member. Attraction 100 also permits visitors to have photographs taken with Santa and to purchase the resulting photographs.

Prior to entering entrance room 111, incoming visitors are greeted by a staff member playing a "greeter" role. Greeters can print passports for arriving visitors. Passports may contain information useful for identifying the Family-ID of the visiting family, such as a short alphanumeric sequence of integers and/or a bar code associated with the Family-ID. Passports may also contain a photograph of the visiting family. The use of passports referencing Family-IDs also allows the connected guest platform to monitor various aspects of a visit and associate their experiences with a Family-ID. For example, passports may be used later to track a visitor's progress from room to room. As another example, passports may also allow the connected guest platform to track a visitor's repeated visits to the attraction.

Once checked in, visitors may proceed to entrance room 111. Entrance room 111 is generally themed according to the overall attraction to immerse visitors into the overall experience. For example, entrance room 111 may provide visitors with a welcome video, playback ambient music, and/or a live skit enacted by staff members, according to the Christmas theme.

From entrance room 111, visitors may proceed to sleigh design room 112. Sleigh design room 112 has touch points that allow visitors to design a computer-generated sleigh. The touch points are connected to the connected guest platform and have computer-graphics user interfaces for graphics design. Visitors may scan their passport (or otherwise enter information from their passport into a kiosk) as they leave room 111 or as they enter room 112, thereby allowing the connected guest platform to save a sleigh designed by the family with their Family-ID. The connected guest platform can make saved sleigh designs available through other touch points (e.g., application, web-site, or computer terminal), allowing visitors to access their sleighs inside and/or outside of attraction 100. A staff member playing a "guide" role may review, through a user interface connected to the connected guest platform, the visitors' progress through sleigh design room 112 and encourage visitors to proceed into the next room if sufficient time has elapsed.

From sleigh design room 112, visitors may proceed to sleigh hangar room 113. Sleigh hangar room 113 allows visitors to take a computer-generated virtual sleigh ride to a virtual North Pole. In some embodiments, sleigh hangar room 113 has display screens adapted to display computer-generated animations, optionally the virtual sleigh created by the visitor at sleigh design room 112. In some embodiments, sleigh hangar room 113 has wearable virtual reality displays (e.g., virtual reality goggles made by Oculus VR, LLC of Irvine, Calif.) adapted to display virtual reality imagery, optionally involving the virtual sleigh created at sleigh design room 112. Visitors may have their passport scanned as they leave room 112 or as they enter room 113, thereby allowing the connected guest platform to retrieve a sleigh of the visitors' design. A guide may encourage visitors to proceed to the next room as the computer-generated animations finishes, or after visitors have spent beyond a threshold amount of time in sleigh hangar room 113.

From sleigh hangar room 113, visitors may proceed to North Pole welcome center 114. North Pole welcome center 114 serves as a waiting area immediately prior to visiting Santa. North Pole welcome center 114 may be decorated with the appearance of the North Pole. North Pole welcome center 114 may contain computer games or activities for entertaining waiting families. Visitors may have their passport scanned as they leave room 113 or as they enter room 114, thereby permitting the connected guest platform to inform staff members that the visitors are waiting to see Santa. A guide may monitor, through a user interface connected to the connected guest platform, whether Santa is ready for the waiting visitors, and/or signal to Santa that visitors are about to proceed to Santa's study 115.

From North Pole welcome center 114, visitors may proceed to Santa's study 115. Visitors may have their passport scanned as they leave room 114 or as they enter room 115. In Santa's study 115, visitors can meet with a staff member dressed as Santa and have their picture taken with Santa.

Santa possesses an electronic device running a staff member application. The electronic device may be disguised as a book. The application communicates with the connected guest platform and displays information about a visiting family, such as the names of the family's members, their photographs, and/or their Christmas wish lists. Thus, Santa is able to greet the visiting family members—particularly children—by name and pretend to predict their desires for Christmas, thereby enhancing the family's experience at attraction 100.

In some embodiments, the application displays comments, provided by guides and greeters who have met the visiting family earlier in rooms 111-115, regarding the visiting family. This information may inform Santa's behavior and/or dialogue with the family. In some embodiments, Santa can add, remove, or rearrange the order of items on a wish list based upon feedback during the visit. For example, Santa may lower the placement of a wish list item in response to a visitor's statement that the particular item is less desirable.

Before leaving Santa's study 115, visitors may have their photograph taken with Santa. Photographs are stored by the connected guest platform and associated with a Family-ID, allowing visitors to subsequently view or purchase their pictures. As a visiting family proceeds to the next room, Santa may indicate on the electronic device that is running the staff member application that he is ready to see the next family.

From Santa's study 115, visitors may proceed to reindeer stable 116. Visitors may have their passport scanned as they leave room 115 or as they enter reindeer stable 116. Reindeer stable 116 provides the attraction's operator an opportunity to interact with soon-departing visitors. In some embodiments, reindeer stable 116 is a fully-equipped retail operation, meaning that visitors can purchase various merchandise from reindeer stable 116. For example, reindeer stable 116 can allow visitors to view and purchase their sleigh designs and/or photographs with Santa. This is achieved by accessing a family's profile through the connected guest platform by use of the Family-ID. As another example, reindeer stable 116 can have electronic kiosk devices for purchasing merchandise (e.g., wish list items) from wish lists for pickup at merchants located in the same shopping structure as attraction 100. Note that reindeer stable 116 need not be completely enclosed within the structure of attraction 100 and that retail displays and point-of-sale kiosks may expand into adjacent spaces.

As visitors depart reindeer stable 116, they may proceed to merchants located at the location of attraction 100 (e.g., at the same mall) to redeem (e.g., pickup) any wish list items that have been purchased. In this way, attraction 100 not only drives consumer traffic to exemplary rooms 111-116 but also encourages on-line consumers (e.g., friends and family who are purchasing a user's wish list items) to direct their spending at merchants physically located adjacent attraction 100.

2. Exemplary Touch Point: End-User User Interface

Figure 2A:
FIGS. 2A-2H depict exemplary user interfaces provided by embodiments of the connected guest platform.

Attention is now directed to an exemplary touch point—an application executable on a portable electronic device—that can be used by a user to interact with the features of a connected guest platform, such as to reserve appointments at a location-based entertainment attraction and to manage shopping lists, with reference to FIGS. 2A-2H. A user wishing to utilize the connected guest platform may begin by registering onto the platform using the application. On launch, the application displays welcome interface 210, as depicted in FIG. 2A. Welcome interface 210 includes user-selectable options 211a-211c. Option 211a, when selected, allows a user to reserve a time at location-based entertainment, such as attraction 100 (FIG. 1). Option 211b, when selected, allows a user to access an existing family profile account. Option 211c, when selected, allows a user to access and/or purchase items from a wish list.

Upon selection of option 211a at welcome interface 210, the user is prompted to provide registration information. Exemplary illustrations of registration interfaces for receiving user information are shown in FIGS. 2B-2E. During registration, a family profile is created and stored in a database of the connected guest platform. A Family-ID, generated after registration, is associated with the family profile and is used to identify the user's family throughout their interactions with aspects of the connected guest platform.

Figure 2B:
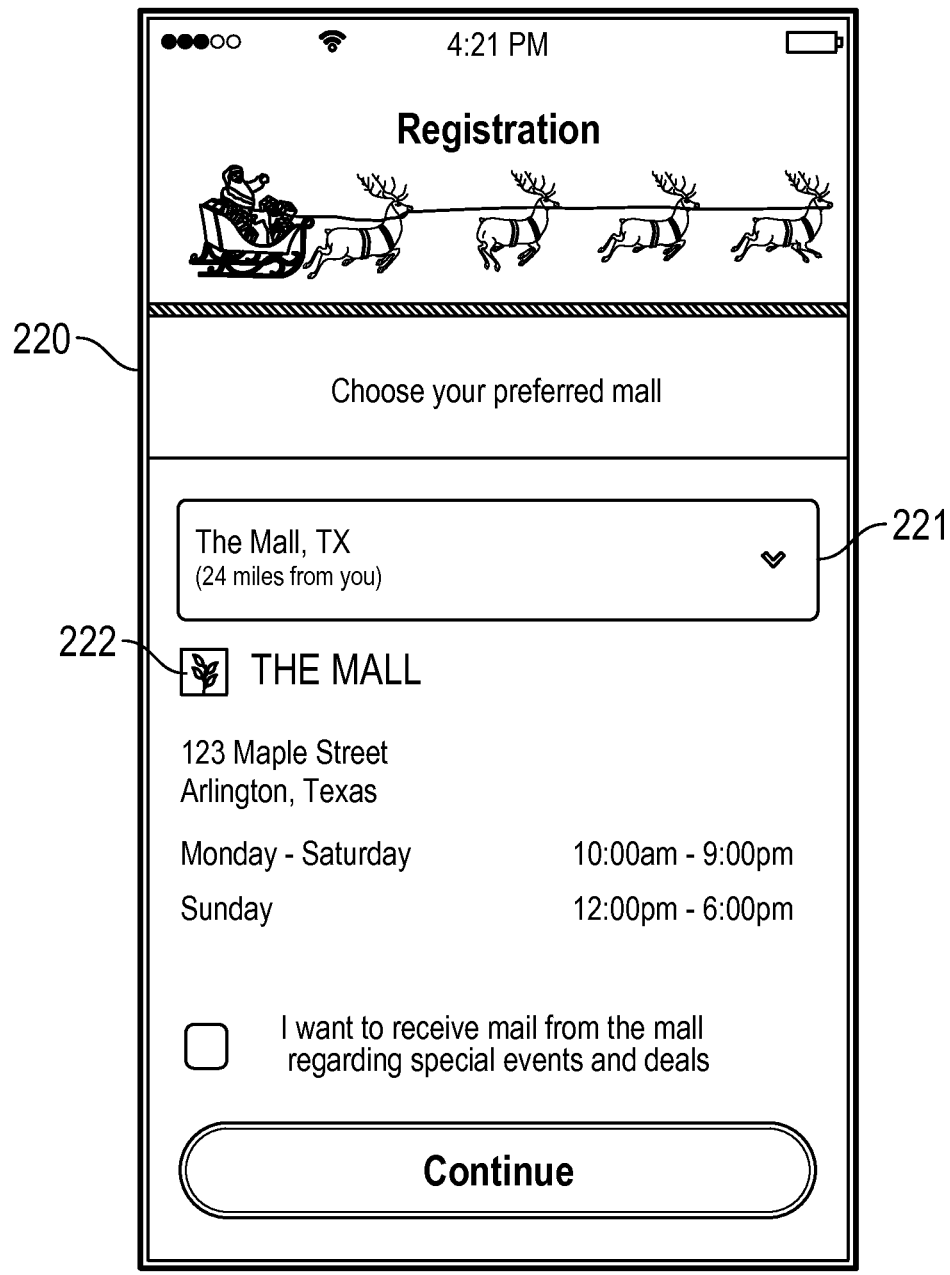

Registration may begin with a prompt for the user to identify a location-based entertainment attraction that the user plans on visiting, such as the shopping mall where attraction 100 is located. As shown in FIG. 2B, location selection interface 220 prompts a user to select a physical shopping location from selector 221. In some embodiments, the list of selectable shopping locations is limited to locations having seasonal attractions that are connected to the connected guest platform. Interface 220 provides information 222 about the selected location, such as street address and hours of operation. The selected shopping location is understood by the connected guest platform as the brick-and-mortar shopping location that the user plans to visit. In some embodiments, the closest available shopping location is pre-selected by default. After a location is selected, the connected guest platform associates a location identifier, e.g., Mall-ID, with the user's Family-ID. In some embodiments (not illustrated), the touch point includes a user-interactive map that indicates available physical shopping locations (e.g., as part of interface 220).

Figure 2C:
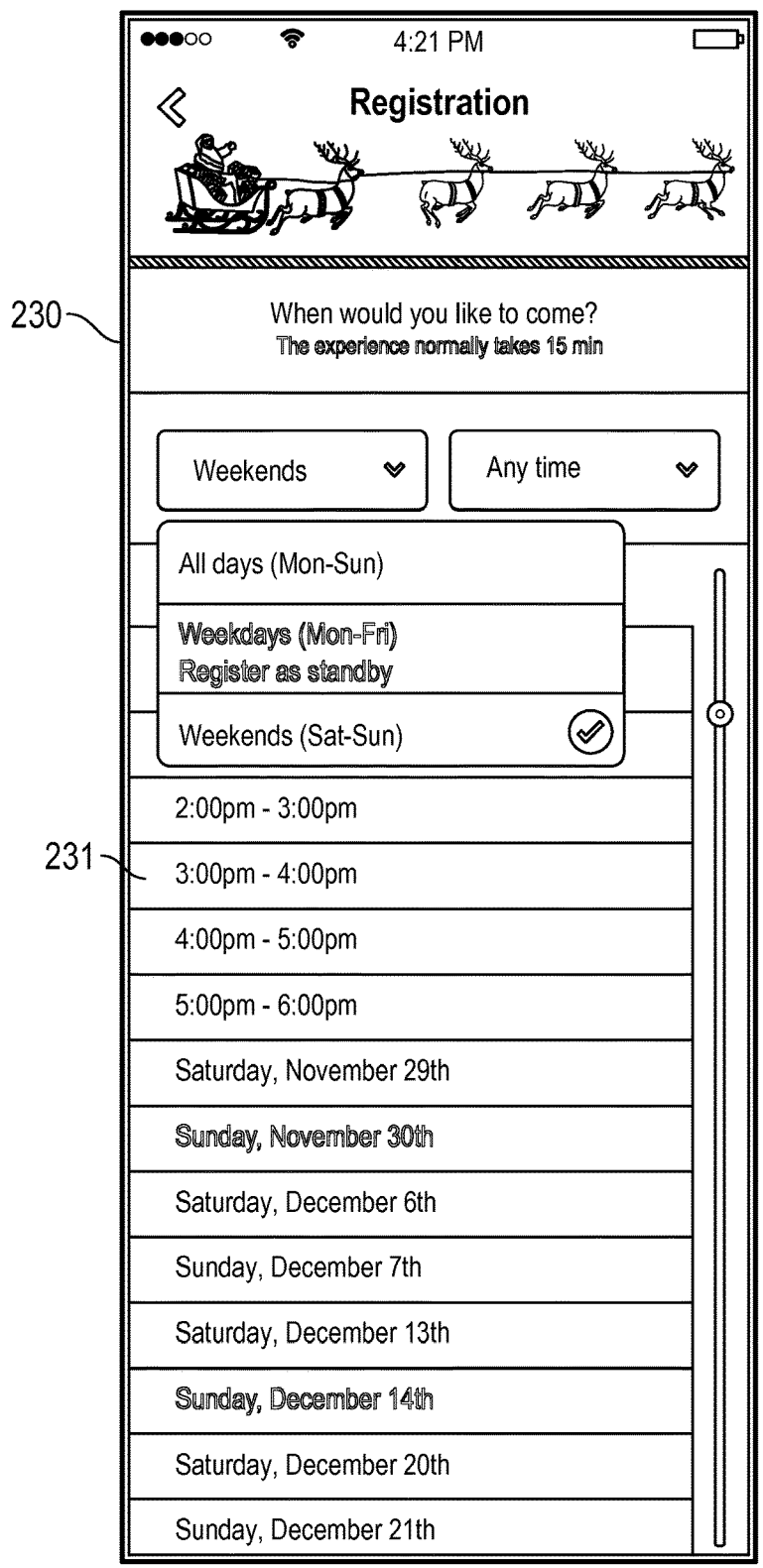

Turning to FIG. 2C while referencing FIG. 2B, upon completion of location selection interface 220 (FIG. 2B), reservation time selection interface 230 (FIG. 2C) is displayed. Interface 230 allows a user to reserve a particular time for visiting an attraction at the brick-and-mortar shopping location selected earlier. Using interface 230, the user may provide a date and time that the user would like to visit the brick-and-mortar shopping location. After a user selects the date and time of their visit, this information is associated with the user's Family-ID, generated at the end of registration, and the location's Mall-ID in the connected guest platform database. In some embodiments (not illustrated), the touch point provides a calendar layout of dates indicating the time slots available for reservation and/or time slots already taken (e.g., as part of interface 230).

Figure 2D:
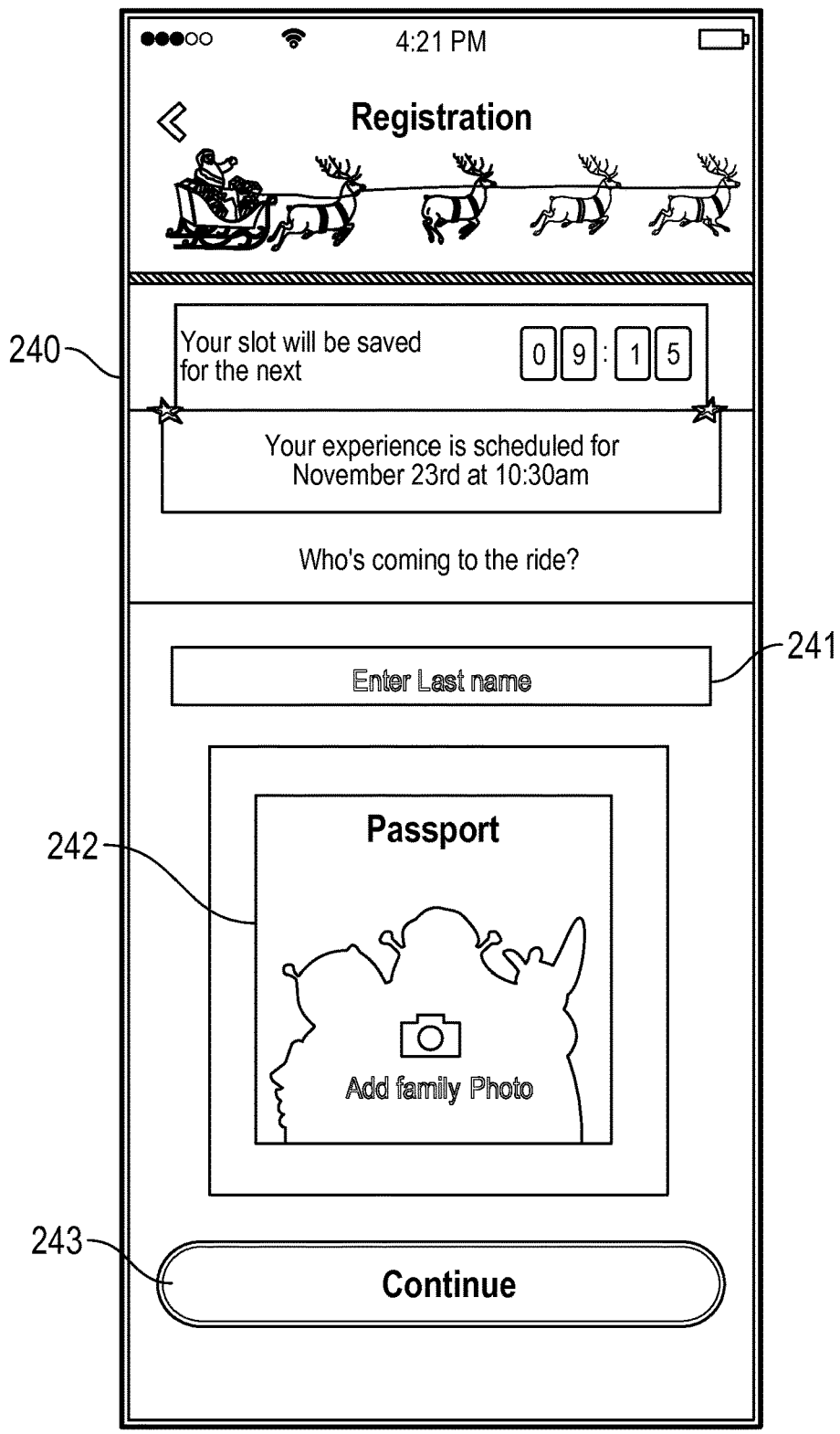

Turning to FIG. 2D while referencing FIG. 2C, upon completion of reservation time selection interface 230 (FIG. 2C), family profile creation interface 240 is displayed. Interface 240 allows a user to enter a family name into family name field 241—such as a last name—that will be associated with a family profile that the connected guest platform will create and store for the user. The family profile contains information about a user, family members, attraction visit plans, wish list information, and so forth. In addition, interface 240 also permits the capturing of a family photograph 242 to be associated with the family. The information input by user at family profile creation interface 240 is then saved in the connected guest platform database and associated with the user's family profile, ultimately identified by a Family-ID. Family profile information also can be used on the passport to provide information regarding a visiting family, such as the family's name and photograph. Family profile information, such as the family's name and photograph, also can be viewed by staff members located at an attraction, thereby permitting staff members to better identify visiting families.

Figure 2E:
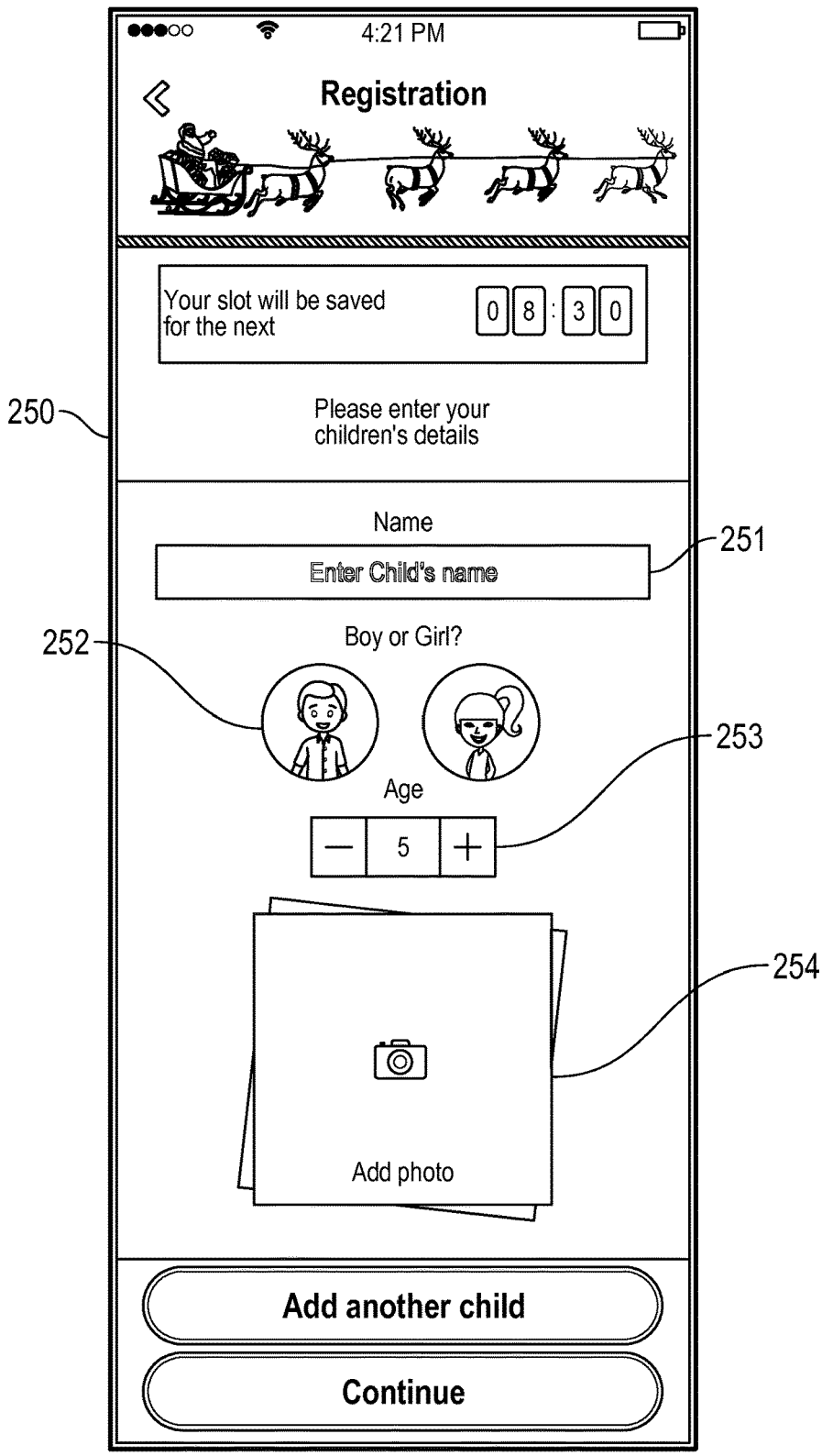

Turning to FIG. 2E while referencing FIG. 2D, upon completion of family profile creation interface 240 (FIG. 2D), child information interface 250 is displayed. Interface 250 allows users to provide information about their children. For example, a user can enter the child's name into name field 251. Interface 250 also contains gender selector 252 and age selector 253. Optionally, a user may capture a picture 254 of the child. The information input by the user at child information interface 250 is then saved in the connected guest platform database and associated with the user's family profile, ultimately identified by a Family-ID. Information about children, such as a child's name, photograph, age, and gender, can be viewed by staff members located at an attraction, thereby permitting staff members to better identify visiting children.

Figure 2F:
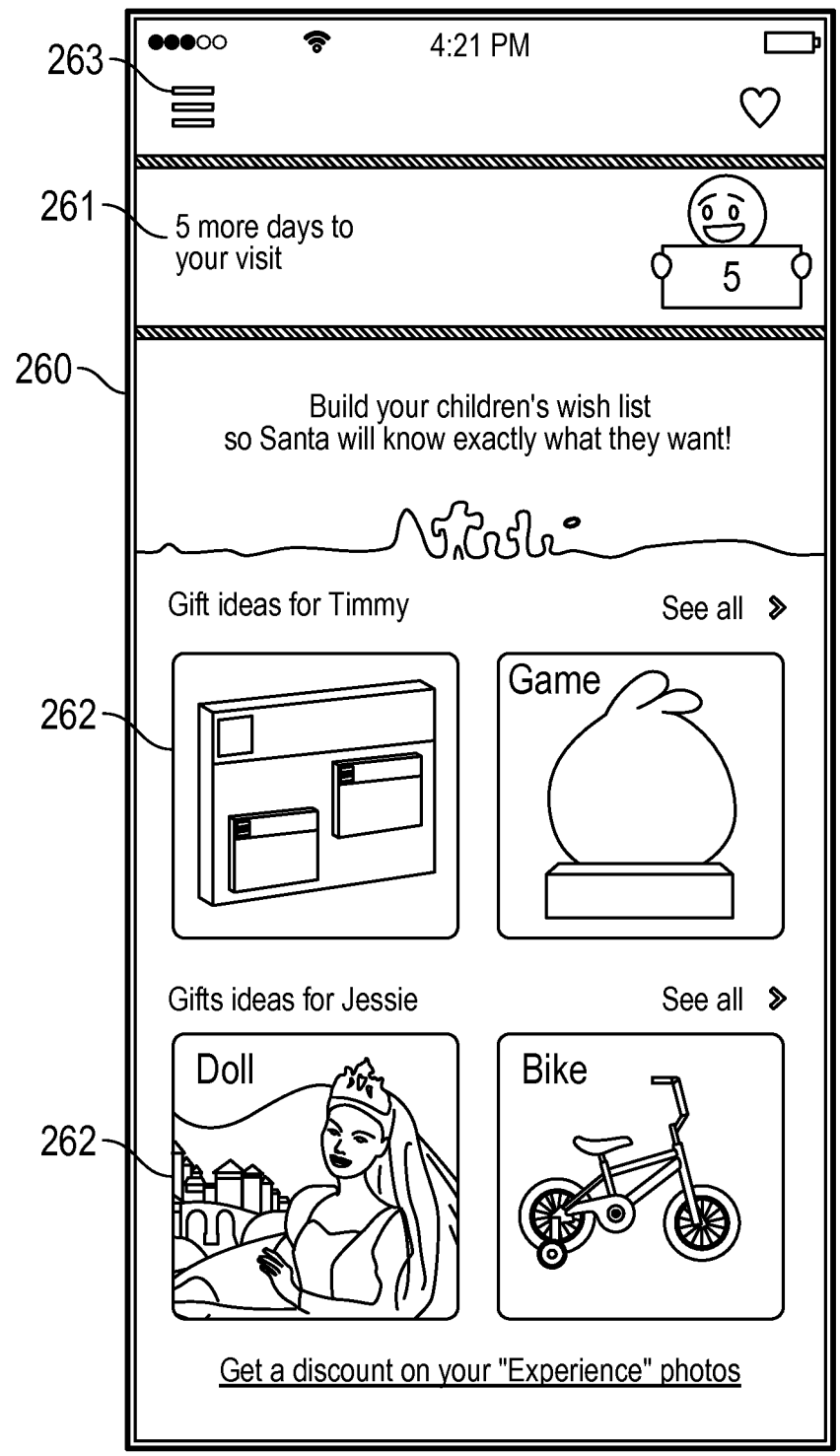

FIG. 2F depicts exemplary home screen 260 provided to registered users, in some embodiments. Home screen 260 displays a countdown notice 261 informing the user of how many days remain until a scheduled reservation for visiting an attraction such as location-based entertainment attraction 100 (FIG. 1A). Home screen 260 displays one or more items 262 available for purchase and pick up at the shopping location where the attraction is located. The contents of the display of the one or more items 262 may be based, in part or in whole, on information contained in a family profile. For example, home screen 260 may display popular toys for children of the same age and gender as one of the individuals associated with the user (e.g., user's son). Home screen 260 also contains selectable menu toggle 263, which causes a menu to be displayed when selected by the user. The menu comprises one or more navigation options that allow the user to easily navigate to various user interfaces, such as to change a reservation, view a catalog, view one or more wish lists, and/or view purchased items. Although not illustrated, home screen 260 may have a share wish list icon for sharing (e.g., text message, e-mail, peer-to-peer transfer, etc.) wish lists with others.

Figure 2G:
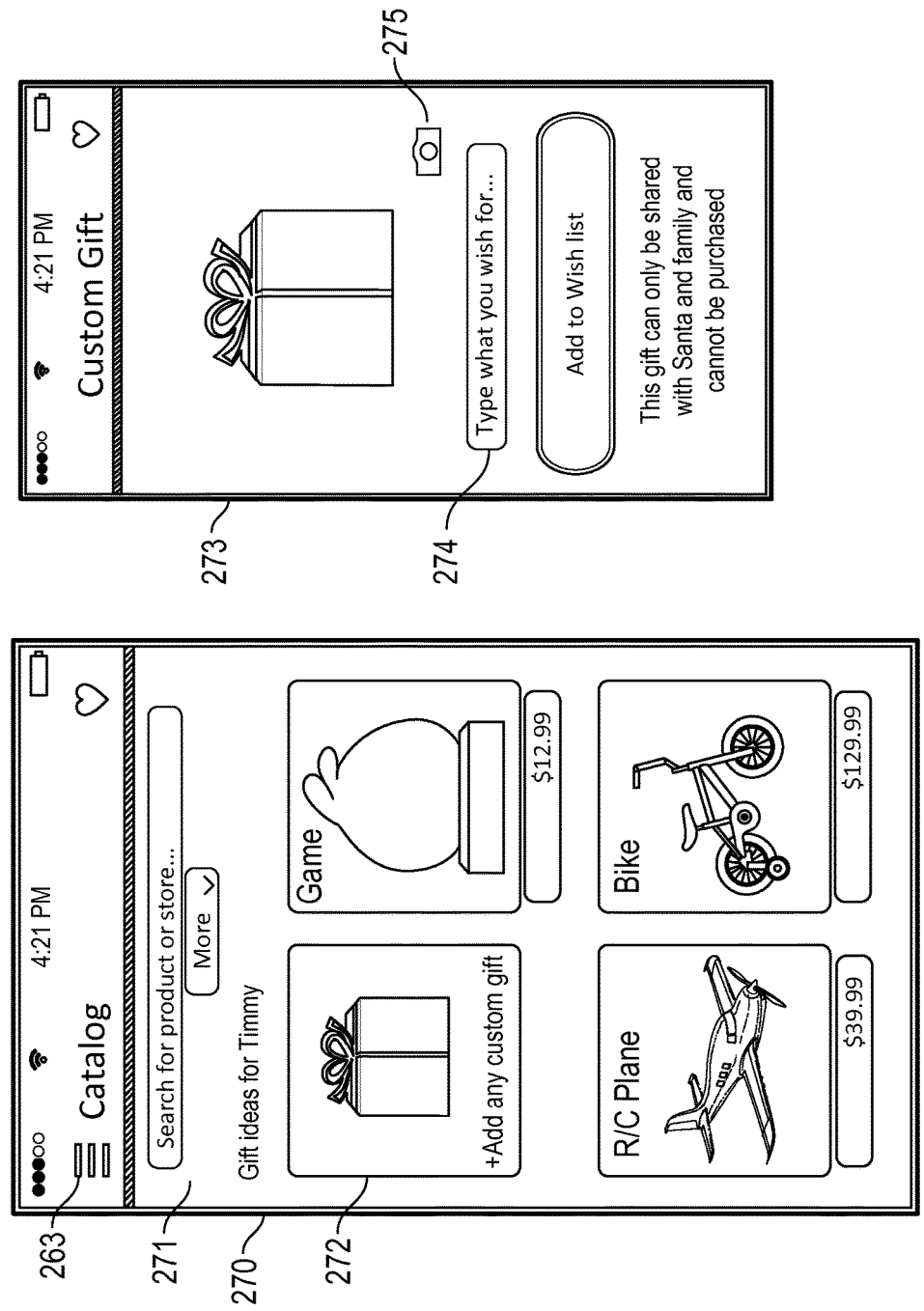

FIG. 2G depicts exemplary home screen 270 provided to registered users, in some embodiments. Home screen 270 may be home screen 260 with additional features that permit a user to create a custom wish list item. As seen in FIG. 2G, a user may select icon 272 to access custom item entry interface 273 for entering details for a custom wish list item. Custom item entry interface 273 has icon 275 for taking a photograph of the desired item. The photograph may be stored by the connected guest platform, associated with the user's Family-ID. Custom item entry interface 273 also has entry field 274 for receiving a description of the custom item. In this way, custom item entry interface 273 permits a user to wish for an item that is not currently available from the shopping catalogs accessible through the connected guest platform.

Figure 2H:
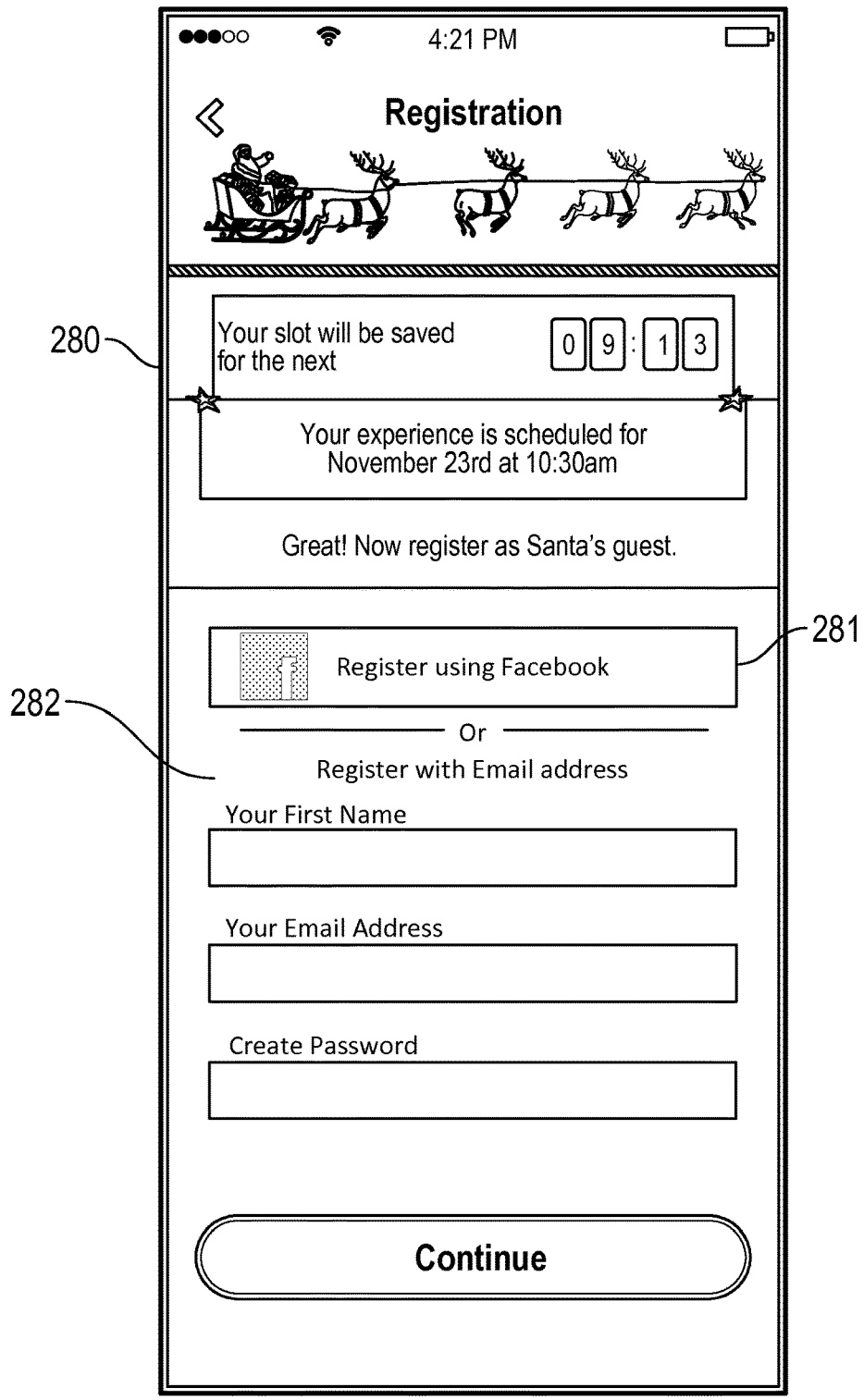

FIG. 2H depicts exemplary registration interface 282 provided to unregistered users, in some embodiments. Registration allows family profile, attraction reservation, and/or wish list information to become associated with a user account. Interface 282 may also provide icon 281 for invoking a third-party authentication process, such as Facebook Login by Facebook Inc. of Menlo Park, Calif. In some embodiments (not illustrated), the touch point provides an interface for adding an entry for the reservation to a calendar application of the user's device. In some embodiments (not illustrated), the touch point provides an interface for sending a calendar entry or invitation to another user. In some embodiments, registration is needed before a user can navigate to home screens 260 or 270 for creating wish lists.

3. Exemplary Touch Point: Staff User Interface

Figure 3A:
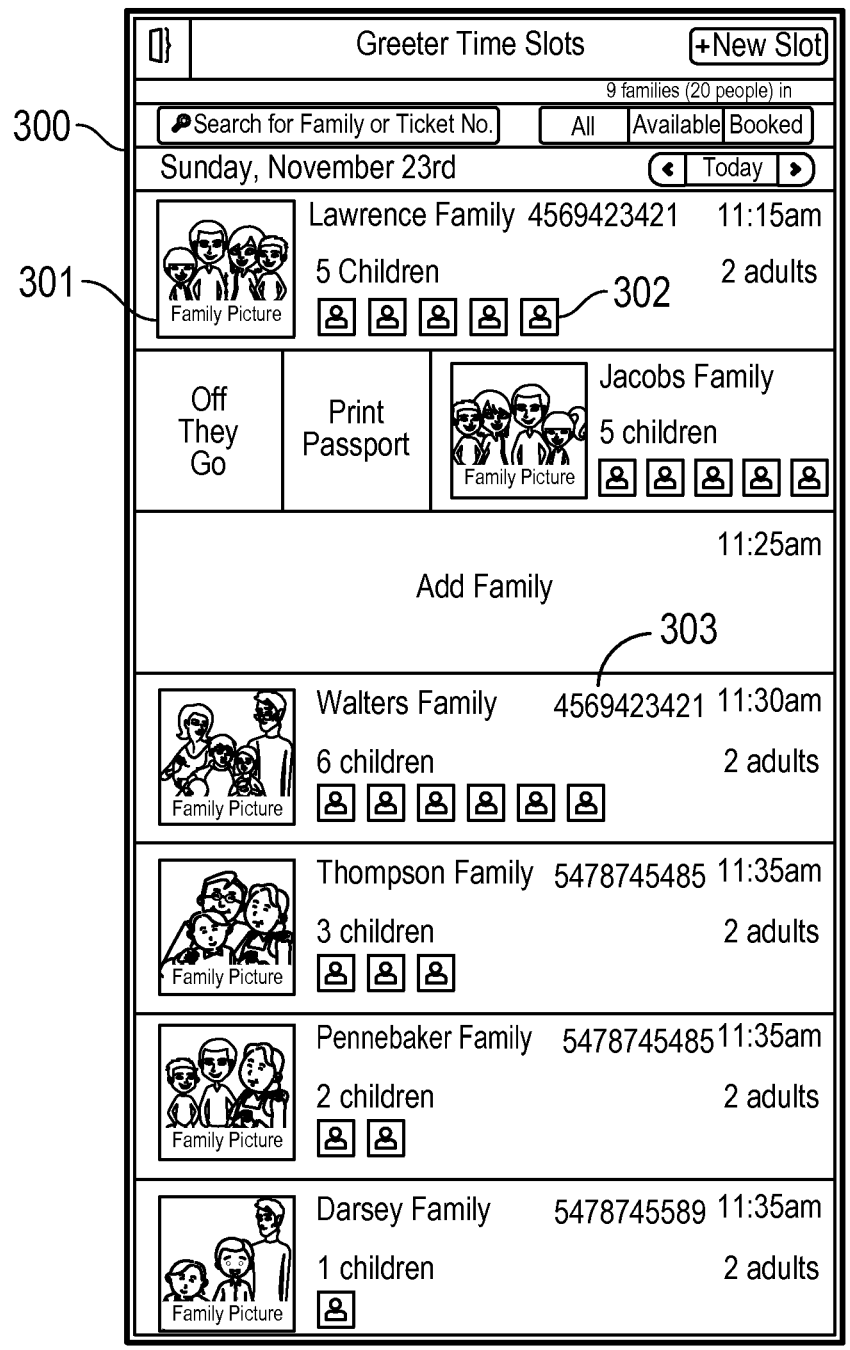
FIGS. 3A-3C depict exemplary user interfaces provided by embodiments of the connected guest platform.
Figure 3B:
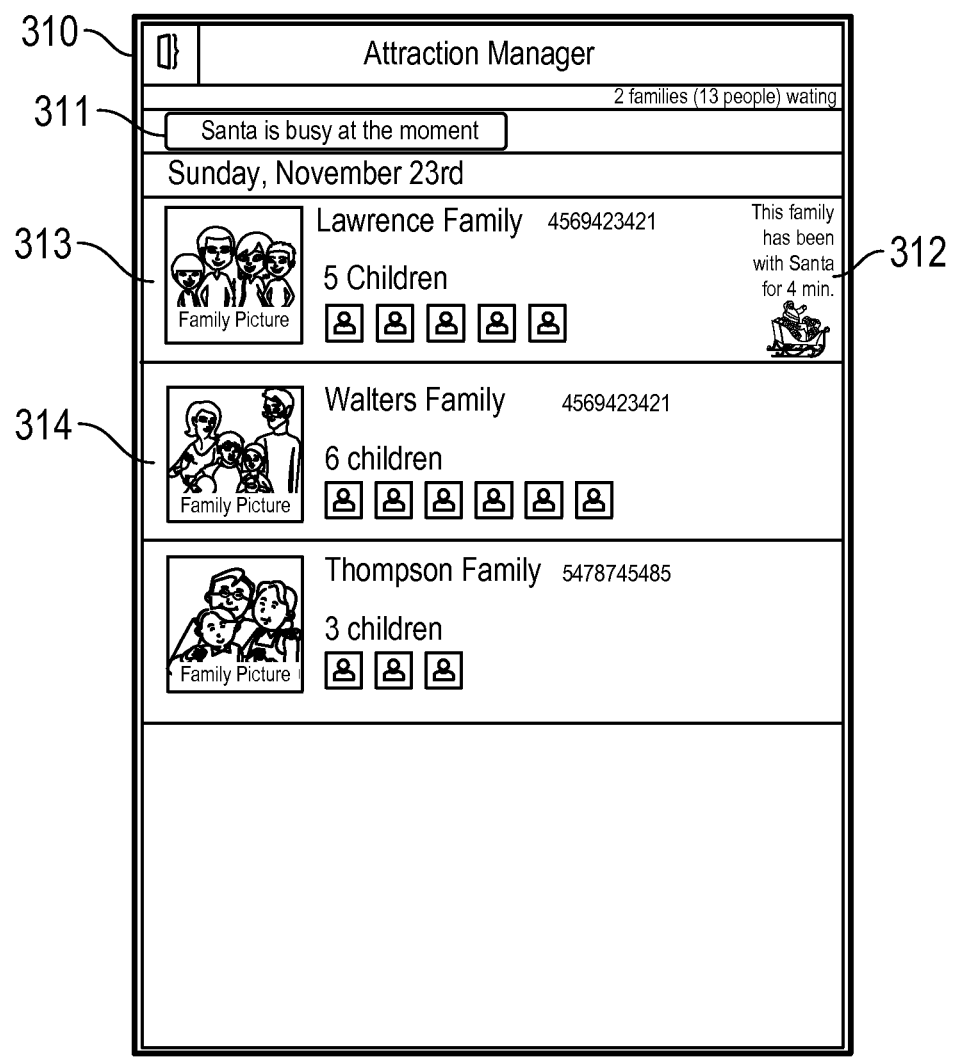
Figure 3C:
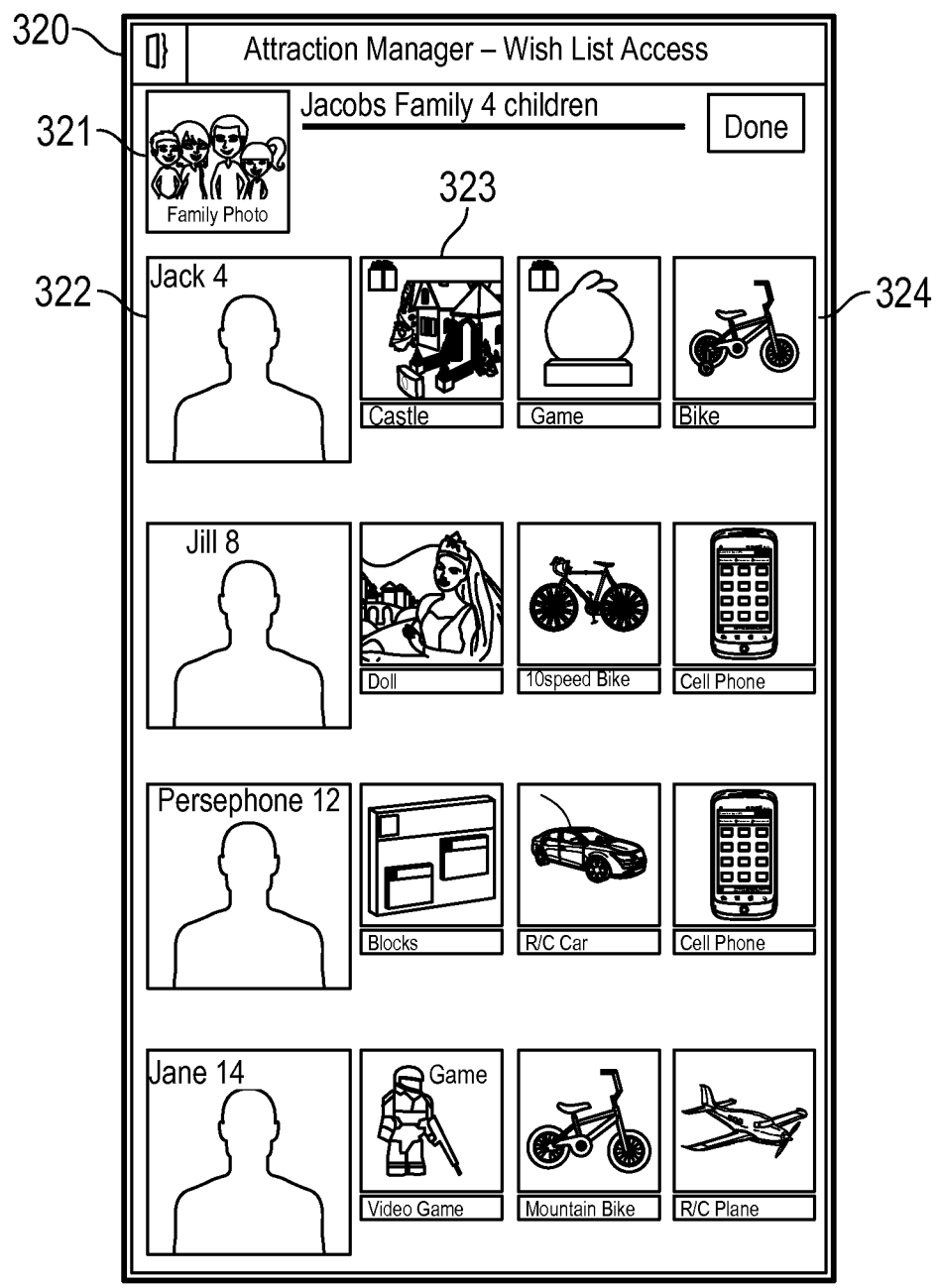

Attention is now directed to an exemplary touch point used by staff members located at a location-based entertainment attraction, such as greeters located at attraction 100 (FIG. 1A), to facilitate visits to the attraction, with reference to FIGS. 3A-3C. FIG. 3A depicts greeter interface 300, which allows a greeter to view and manage scheduled visits to an attraction. Interface 300 provides information about upcoming reservations, such as family name, Family-ID indication 303, family photograph 301, and family size associated with a particular reservation time. A greeter, such as those staffed at entrance room 111 of attraction 100 (FIG. 1B) can use interface 300 to check in, add, and/or remove reservations. A greeter can also use interface 300 to print visitor passports. In some embodiments, interface 300 also permits a greeter to capture a photograph of the family and/or individual family members. Photographs of a visiting family help staff members identify visitors within the attraction. Greeter interface 300 is connected to and receives visitor information from the connected guest platform. Greeter interface 300 may access wish list information based on Family-ID and Mall-ID.

FIG. 3B depicts an attraction manager interface 310 used by staff members located at an attraction, such as "guides" located at attraction 100 (FIG. 1A), to control the flow of visitors. Attraction manager interface 310 maintains and displays various statistics about the attraction and visiting families. From attraction manager interface 310, a guide may view the progress of families through the attraction. Indicator 311 informs staff members whether Santa is available or busy. Visitor timer 312 provides further notification that Santa has been with family 313 for a duration of four minutes. Information provided by indicator 311 and visitor timer 312 permits staff members to control the visitor flow through attraction 100. In some embodiments, the timer may generate a signal, or otherwise indicate when a visit has exceeded a certain time threshold. For example, a staff member receives an enhanced notification if a current family has been with Santa for fifteen minutes or more (exceeding a predetermined amount of time). Attraction manager interface 310 also lists families currently waiting to enter the next room of the attraction, such as waiting family 314. Attraction manager interface 310 is connected to and receives visitor information from the connected guest platform. Attraction manager interface 310 may access wish list information based on Family-ID and Mall-ID.

FIG. 3C illustrates a wish list access interface 320 used by staff members located at an attraction, such as Santa located at attraction 100 (FIG. 1A), to view and manage wish list 324 of member 322 in visiting family 321. In some embodiments, wish list access interface 320 automatically displays to a staff member when a family reaches a certain portion of the attraction. For example, moments before a family enters Santa's study (room 115 in FIG. 1B), the staff member who is acting as Santa may review the family members' wish lists, so as to inform his dialogue with the family members. A staff member can add, delete, change, or otherwise adjust wish list items through interface 320. For example, if a family member—particularly a child—expresses a keen desire for a specific gift, a staff member can prioritize the particular gift to the top of the child's wish list, thereby enhancing the likelihood that the particular gift will be purchased. Wish list access interface 320 can also display comments left by staff members (e.g., greeters and guides) who have met the visiting family 321 in a previous portion of the attraction. Wish list access interface 320 is connected to and receives visitor information from the connected guest platform. Wish list access interface 320 may access wish list information based on Family-ID and Mall-ID.

4. The Connected Guest Platform Backend

As seen in the preceding description, various touch points may communicate with the connected guest platform to provide or obtain user data referencing user identification information such as Family-ID and Mall-ID. In some embodiments, the connected guest platform includes internet-enabled server computer(s) providing application programming interfaces (APIs) usable by touch points for communication. More generally, the connected guest platform may have a cloud-based component that maintains and offers user information to a variety of networked touch points depending on the particular application.

Networked touch points can generally include: a web-site connected to the platform, an application running on a portable electronic device that is in communication with the platform API, a computerized kiosk that is in communication with the platform API, and the like. Compatible electronic devices include cellular phones (e.g., smartphones), tablet computers, laptop computers, desktop computers, and so forth.

Figure 4:
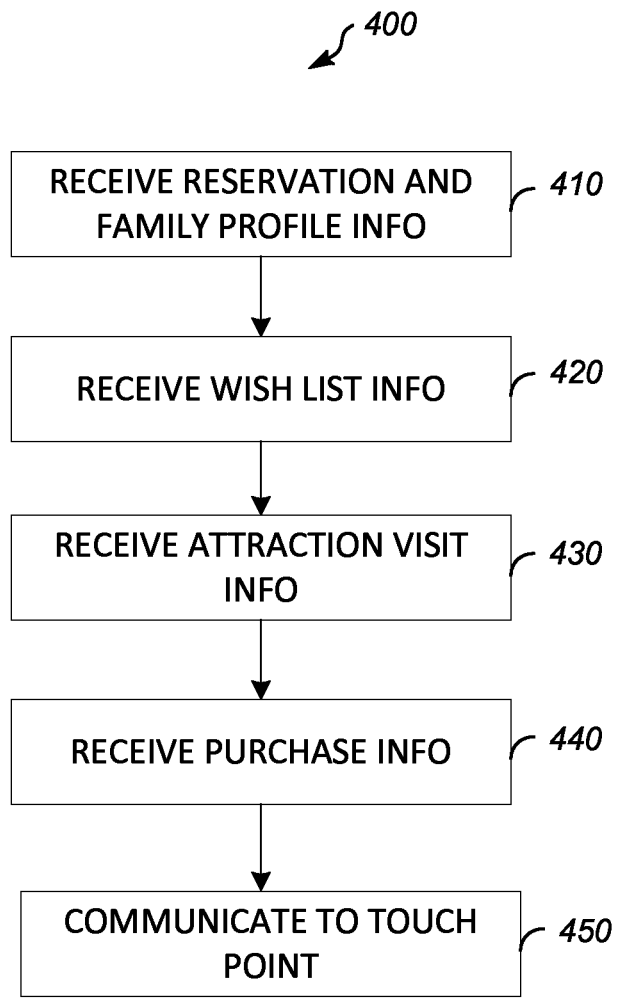
FIG. 4 is a block diagram of an exemplary process for providing a connected guest platform.

Attention is now directed to FIG. 4 depicting exemplary process 400 which may be carried out by a cloud-based connected guest platform to provide the features described with respect to FIGS. 1-3. At block 410 of process 400, user identification information regarding a family profile and a desired reservation is received. The received information identifies a desired visit to a location-based entertainment attraction, such as attraction 100 (FIG. 1A-1B). The information may be received from a user interface such as those described with reference to FIGS. 2B-2E and FIGS. 3A-3C. Responsive to receiving the user data, the connected guest platform may create and assign a Family-ID to the family profile, assign a Mall-ID identifying the location of the selected attraction to the family profile, and place a reservation at the specified attraction.

At block 420, data about a wish list is received. The wish list data may be received using the techniques described above with reference to the end-user user interfaces, including FIG. 2F, as well as the staff user interfaces described above with reference to FIG. 3A. Such data may include, for example, items that have been added to an individual wish list associated with a Family-ID, and are stored to a database component of the connected guest platform.

At block 430, information regarding the user's scheduled visit to the attraction is received. In one example, the received information indicates that the user has just arrived to the attraction. Responsive to this information, the connected guest platform transmits information for printing a visitor passport that references the Family-ID associated with the user. In another example, the received information contains a work product, such as a virtual sleigh, that has been created or customized by the user at the attraction. Responsive to the received information, the connected guest platform stores the work product. In another example, the received information includes a work product such as a photograph taken of the user at the attraction. Responsive to the received information, the connected guest platform stores the work product. In another example, the received information includes a request for a stored work product. Responsive to the received information, the connected guest platform sends the requested work product—such as a photograph of the family—to the requester.

At block 440, a third-party purchase of a shopping list item is received. Responsive to the purchase, a proof-of-purchase is made available to the user of the shopping list. At block 450, the connected guest platform retrieves one or more of the stored information (from blocks 410-440) and transmits the retrieved information to a touch point. The receiving touch point could be, for example, an application or website described above with respect to FIGS. 2 and 3. The transmitted information can include, for example, one or more of the work products received at block 430. The transmitted information also can include, for example, data regarding the user's visit to an attraction.

Figure 5:
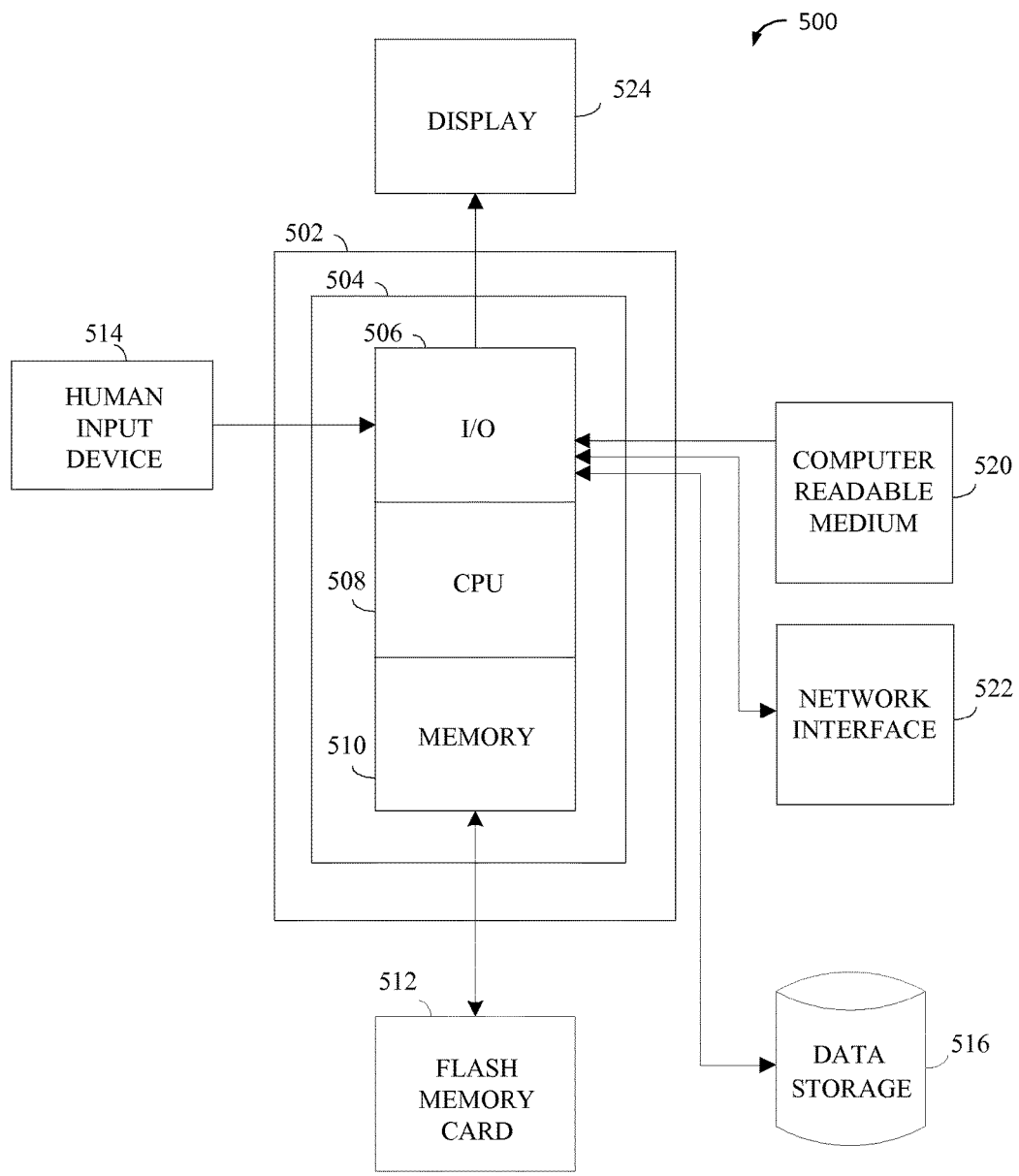
FIG. 5 depicts exemplary computing systems for performing processes for creating a connected guest platform.

Attention is now directed to FIG. 5, which illustrates exemplary computing system 500 which can be used as a computer server for the connected guest platform and to carry out, for example, process 400 (FIG. 4). In addition, computing system 500 can be used to facilitate the provision of the exemplary user interfaces and touch points described above with respect to FIGS. 1-3.

Exemplary computing system 500 includes a motherboard 502 having I/O section 506, one or more central processing units (CPU) 508, and memory section 510. Memory section 510 may be based on various memory modules, such as DIMM memory modules. Memory section 510 also may be operatively coupled, directly or indirectly through I/O section 506, with other memory modules, such as flash memory card 512, a USB memory stick, and the like. I/O section 506 is operatively coupled with display 524, human input device 514, network interface 522, and data storage unit 516. Data storage unit 516 may be a disk drive, solid-state storage device, internet-based (e.g., cloud) storage, and the like. Network interface 522 permits computing system 500 to communicate with touch points such as those described above with reference to FIGS. 1-4.

Computing system 500 has computer-executable instructions for performing the above-described techniques, including process 400 (FIG. 4). Such computer-executable instructions may be stored in memory section 510. Memory section 510 may obtain the computer-executable instructions from various sources including flash memory 512, data storage unit 516, computer-readable medium 520, network interface 522, and so forth. Data storage unit 516 may itself be, or may be a device configured to read from, a non-transitory computer-readable medium 520 that is used to store (e.g., tangibly embody) one or more computer programs for performing the above-described techniques and processes. The computer program may be written using technologies such as C, Java, JavaScript, HTML5, Python, PHP, MySQL, Android™ software toolkit ("STK") made by Google Inc. of Mountain View, Calif., and/or iOS™ software development toolkit made by Apple Inc. of Cupertino, Calif.

5. Additional Features of the Connected Guest Platform

Although only certain exemplary embodiments have been described in detail above, those skilled in the art will readily appreciate that many modifications are possible in the exemplary embodiments without materially departing from the novel teachings and advantages of this disclosure.

For example, although exemplary attraction 100 is a Christmas-themed photography attraction, the connected guest platform can utilize attractions of other designs. In some embodiments, the attraction is directed to another seasonal celebration such as Easter, Halloween, the lunar new year, and so forth. In some embodiments, the attraction is a secular display that celebrates a particular time of year, such as the arrival of summer break for schoolchildren. In some embodiments, the attraction is related to a current event. More generally, it is helpful (though not always necessary) for the attraction to be one optimized for an in-person experience, so as to encourage consumer traffic to a physical location. Other possible attractions include those based on seasons, media releases (movies, games, books, etc.), national holidays, appearances of celebrities or other famous personalities, or generally any other theme that increases consumer desire to visit a physical location.

As another example, although the described attraction 100 (FIG. 1A) is located at an indoor shopping mall, the connected guest platform can utilize attractions at other locations. For example, department stores, and outdoor shopping areas are also possible locations for attractions. Conceptually, an attraction may be located at any location. For example, the connected guest platform can leverage attractions that are located at event venues, sports stadiums, theme parks, and so forth. Certainly, it may be helpful to locate an attraction strategically to encourage consumer traffic to vendors and/or merchants located nearby.

As another example, information maintained by the connected guest platform may be used to improve a user's experience with third party applications. For example, an application developer may connect to the platform to obtain information that changes the behavior of their applications for specific users. This may be achieved by parsing the behavior and experiences associated with a Family-ID. As another example, information maintained by the connected guest platform may be used by third-party developers to develop a virtual universe.

In some embodiments, the connected guest platform permits population into shopping lists only those items that are retrievable from merchants located at a physical shopping location where the seasonal attraction is, by maintaining information about retailers operating at a particular shopping location (e.g., by Mall-ID lookup). That is, the platform need not permit delivery of purchased items. Optionally, the platform allows population of in-stock items only, meaning that the connected guest platform is connected to inventory databases that permit inventory checks for particular items at particular merchants at the location of the location-based entertainment (e.g., by Mall-ID lookup).

In some embodiments, the online purchase of a wish listed item through a touch point connected to the connected guest platform causes a proof-of-purchase to be generated and stored. The proof-of-purchase is stored in a connected user platform database and associated with the Family-ID of the wish list creator. Users can access proof-of-purchases associated with their Family-ID, giving users the ability to pick up the corresponding items at the shopping location that they have planned to visit (e.g., the location of attraction 100). The proof-of-purchase can contain a bar code or other information that permits authorization for merchandise pickup.

Aspects of the embodiments disclosed above can be combined in other combinations to form additional embodiments. Accordingly, all such modifications are intended to be included within the scope of this technology.

What is claimed is:

1. A non-transitory computer-readable storage medium having computer-executable instructions, wherein the computer-executable instructions, when executed by one or more processors of a guest tracking platform, cause the guest tracking platform to track a user's experience at an attraction, the computer-executable instructions comprising instructions for: receiving data representing a user's scheduling of a reservation at an attraction located at a physical shopping mall; assigning an identification for the user and associating data representing the reservation with the identification; receiving, from an electronic device at the attraction, data representing the user's actual visit to the attraction indicating arrival of the user to the attraction; during the user's actual visit to the attraction, tracking the user's physical progress through a plurality of rooms of the attraction, wherein tracking the user's physical progress comprises: receiving, from the electronic device at the attraction configured to detect user progress between rooms, an indication that the user has entered a first room of the attraction; in response to receiving the indication that the user has entered a first room of the attraction, determining that the user is in the first room and transmitting information associated with the identification to a first electronic device of the attraction located in the first room of the attraction; receiving, from the first electronic device located in the first room of the attraction, data generated from the user's actual visit to the attraction, wherein the data generated from the actual visit is generated by the first electronic device in the first room of the attraction; associating the data generated from the user's actual visit to the attraction with the identification for the user; subsequent to receiving the indication that the user has entered the first room of the attraction, receiving, from the electronic device at the attraction configured to detect user progress between rooms, an indication that the user has entered a second room of the attraction; and in response to receiving the indication that the user has entered the second room of the attraction, determining that the user is in the second room and transmitting information associated with the identification to a second electronic device of the attraction located in the second room of the attraction, wherein the information associated with the identification that is transmitted to the second electronic device includes the data generated from the user's actual visit to the attraction.

2. The non-transitory computer-readable storage medium of claim 1, wherein the attraction is a photography provider and the data generated from the user's actual visit to the attraction comprises a photograph.

3. The non-transitory computer-readable storage medium of claim 1, wherein data generated from the user's actual visit to the attraction comprises a computer-generated graphic created by the user during the visit to the attraction.

4. The non-transitory computer-readable storage medium of claim 1, wherein the computer-executable instructions comprises instructions for:
   receiving data representing the user's selection of at least one requested gift for a gift-recipient other than the user; and
   associating the at least one requested gift with the identification.

5. The non-transitory computer-readable storage medium of claim 4, wherein the data generated from the user's actual visit is data representing an update to the at least one requested gift.

6. The non-transitory computer-readable storage medium of claim 4, wherein the computer-executable instructions comprises instructions for:
   determining whether the at least one requested gift is available for pickup at a store physically located at the physical shopping mall; and
   displaying an indication representing whether the at least one requested gift is available for pickup in accordance with the determination.

7. The non-transitory computer-readable storage medium of claim 1, wherein the data generated from the user's actual visit is data generated by a second user other than the user.

8. The non-transitory computer-readable storage medium of claim 1,
wherein receiving, from the first electronic device located in the first room of the attraction, the data generated from the user's actual visit to the attraction comprises receiving a change to a user-defined list of items associated with the identification; and
wherein transmitting information associated with the identification to the second electronic device of the attraction located in the second room of the attraction comprises transmitting the user-defined list of items including the change to the second electronic device.

9. The non-transitory computer-readable storage medium of claim 8, further comprising:
prior to the user's actual visit to the attraction, receiving the user-defined list of items.

10. A method comprising: at a cloud-based computing system operably connected to a plurality of remote computing systems: receiving data representing a user's scheduling of a reservation at an attraction located at a physical shopping mall; assigning an identification for the user and associating data representing the reservation with the identification; receiving, from an electronic device at the attraction, data representing the user's actual visit to the attraction indicating arrival of the user to the attraction; during the user's actual visit to the attraction, tracking the user's physical progress through a plurality of rooms of the attraction, wherein tracking the user's physical progress comprises: receiving, from the electronic device at the attraction configured to detect user progress between rooms, an indication that the user has entered a first room of the attraction; in response to receiving the indication that the user has entered a first room of the attraction, determining that the user is in the first room and transmitting information associated with the identification to a first electronic device of the attraction located in the first room of the attraction; receiving, from the first electronic device located in the first room of the attraction, data generated from the user's actual visit to the attraction, wherein the data generated from the actual visit is generated by the first electronic device in the first room of the attraction; associating the data generated from the user's actual visit to the attraction with the identification for the user; subsequent to receiving the indication that the user has entered the first room of the attraction, receiving, from the electronic device at the attraction configured to detect user progress between rooms, an indication that the user has entered a second room of the attraction; and in response to receiving the indication that the user has entered the second room of the attraction, determining that the user is in the second room and transmitting information associated with the identification to a second electronic device of the attraction located in the second room of the attraction, wherein the information associated with the identification that is transmitted to the second electronic device includes the data generated from the user's actual visit to the attraction.

11. The method of claim 10, wherein the attraction is a photography provider and the data generated from the user's actual visit to the attraction comprises a photograph.

12. The method of claim 10, wherein data generated from the user's actual visit to the attraction comprises a computer-generated graphic created by the user during the visit to the attraction.

13. The method of claim 10, further comprising:
receiving data representing the user's selection of at least one requested gift for a gift-recipient other than the user; and
associating the at least one requested gift with the identification.

14. The method of claim 13, wherein the data generated from the user's actual visit is data representing an update to the at least one requested gift.

15. The method of claim 13, further comprising:
determining whether the at least one requested gift is available for pickup at a store physically located at the physical shopping mall; and
displaying an indication representing whether the at least one requested gift is available for pickup in accordance with the determination.

16. The method of claim 10, wherein the data generated from the user's actual visit is data generated by a second user other than the user.

17. A connected guest system comprising a server operably connected over the internet to a plurality of remote computing systems, the server comprising storage memory connected to one or more processors configured to: receive data representing a user's scheduling of a reservation at an attraction located at a physical shopping mall; assign an identification for the user and associating data representing the reservation with the identification; receive, from an electronic device at the attraction, data representing the user's actual visit to the attraction indicating arrival of the user to the attraction; during the user's actual visit to the attraction, track the user's physical progress through a plurality of rooms of the attraction, wherein tracking the user's physical progress comprises: receive, from the electronic device at the attraction configured to detect user progress between rooms, an indication that the user has entered a first room of the attraction; in response to receiving the indication that the user has entered a first room of the attraction, determine that the user is in the first room and transmit information associated with the identification to a first electronic device of the attraction located in the first room of the attraction; receive, from the first electronic device located in the first room of the attraction, data generated from the user's actual visit to the attraction, wherein the data generated from the actual visit is generated by the first electronic device in the first room of the attraction; associate the data generated from the user's actual visit to the attraction with the identification for the user; subsequent to receiving the indication that the user has entered the first room of the attraction, receive, from the electronic device at the attraction configured to detect user progress between rooms, an indication that the user has entered a second room of the attraction; and in response to receiving the indication that the user has entered the second room of the attraction, determine that the user is in the second room and transmit information associated with the identification to a second electronic device of the attraction located in the second room of the attraction, wherein the information associated with the identification that is transmitted to the second electronic device includes the data generated from the user's actual visit to the attraction.

18. The system of claim 17, wherein the attraction is a photography provider and the data generated from the user's actual visit to the attraction comprises a photograph.

19. The system of claim 17, wherein data generated from the user's actual visit to the attraction comprises a computer-generated graphic created by the user during the visit to the attraction.

20. The system of claim 17, the one or more processors further configured to:
- receive data representing the user's selection of at least one requested gift for a gift-recipient other than the user; and
- associate the at least one requested gift with the identification.

21. The system of claim 20, wherein the data generated from the user's actual visit is data representing an update to the at least one requested gift.

22. The system of claim 20, the one or more processors further configured to:
- determine whether the at least one requested gift is available for pickup at a store physically located at the physical shopping mall; and
- display an indication representing whether the at least one requested gift is available for pickup in accordance with the determination.

23. The system of claim 17, wherein the data generated from the user's actual visit is data generated by a second user other than the user.

\* \* \* \* \*